Patented June 4, 1940

2,202,994

UNITED STATES PATENT OFFICE 2,202,994

PROCESS FOR MAKING ALKALI METAL AMIDES

Julius A. Nieuwland, Notre Dame, Ind., assignorto E. I. du Pont de Nemours & Company, Wilmington, Del., a corporation of Delaware No Drawing. Application March 7, 1936,
Serial No. 67,679

2 Claims. (Cl. 23—190)

This invention relates to the manufacture of amides of alkali metals. More particularly it relates to an improved method for manufacturing such amides from alkali metals and liquid ammonia. Still more particularly it relates to the manufacture of sodamide.

The customary process for the large scale manufacture of sodium amide (sodamide) consists in passing ammonia gas through molten sodium metal. It is necessary for the complete conversion of the sodium that this operation be carried out above the melting point of sodamide, which is about 208° C. In order to complete the reaction in a reasonably short time, it is necessary to work at a temperature above 250° C., as was shown by Dennis and Browne, Zeit. anorg. Chem. 40 82 (1904). In fact, current commercial practice is to use a reaction temperature of about 380° C. Lower temperatures have been used as shown by U. S. Patent 1,646,372, in which liquid sodium is reacted with ammonia gas cooled below 5° C.

It has been shown (U. S. Patent 1,359,080) that oxygen compounds of sodium, for example sodium hydroxide and sodium oxides, catalyze the reaction and increase the rate at which sodamide is formed.

For a long time it has been known that alkali metals dissolve readily in liquid ammonia and that in such solution the metal reacts slowly with the solvent evolving hydrogen and giving a solution of the alkali amide in ammonia. (Joanius, Compt. rend. 112 392 (1891). Franklin, J. A. C. S. 27 831 (1905), first noticed that this reaction was catalyzed by platinum black or by ferric oxide, and used it as a method of preparation for potassium amide. Later McGee, J. A. C. S. 43 586 (1921) described a laboratory method for preparing sodamide from sodium solutions in liquid ammonia, using platinum black as a catalyst.

An attempt to use this reaction commercially is described in British Patent 222,718, where sodium cyanide is added to a solution of sodium in liquid ammonia, the steel walls of the reaction vessel catalyzing the reaction. The catalytic action of ferric oxide upon the reaction between potassium and liquid ammonia is noted by White and Knight, J. A. C. S. 45 1785 (1923) and by White, Morrison and Anderson, J. A. C. S. 46 964 (1924). Burgess and Smoker, Chem. Rev. 8 265 (1931) ascribe a catalytic action to finely divided manganese in this reaction.

It has not been found possible, however, hitherto, to manufacture amides from alkali metals and liquid ammonia in commercially practicable amounts and by a sufficiently complete and rapid reaction. Catalysts for the reaction have been disclosed as mentioned above but a great need for a more efficient catalyst still remains so far as the prior art is concerned.

This invention has as an object to provide an improved process for the manufacture of alkali metal amides. A further object is to provide a process which will not require such excessively high temperatures or long period of time as those used at present. A still further object is to provide an improved catalytic process for the production of alkali metal amides from alkali metals and liquid ammonia and particularly from sodium and liquid ammonia. Other objects will appear hereinafter.

These objects are accomplished by reacting alkali metals with liquid ammonia, preferably in excess, in the presence of an oxide of an alkali metal together with a small amount of an ammonia-soluble hydrated salt of iron, cobalt or nickel. The preferred alkali metal is sodium and when it is used an oxide of sodium is preferably also used.

The oxides of sodium or other alkali metal may be introduced into the reaction mixture as such or more conveniently produced in situ. The latter is done by dissolving a small quantity of the sodium, for example, in the liquid ammonia and allowing the solution to stand exposed to air or passing air through the solution.

In order to more clearly illustrate the invention, the following examples are given. It is to be understood, however, that these examples are to be construed as illustrative only and not as limiting the scope of the invention. The term "parts," wherever used in these examples, is intended to mean "parts by weight."

*Example I*

To 330 parts by weight of liquid ammonia was added 0.3 part of finely powdered ferric nitrate ($Fe(NO_3)_3.6H_2O$) and the mixture stirred rapidly. One part by weight of metallic sodium was added and air was then bubbled through until the blue color was discharged. Twenty-five parts by weight of metallic sodium was then added in the form of small pieces. A vigorous reaction set in, hydrogen was evolved, and the color of the solution became first blue and finally gray. The reaction mixture was then diluted by adding 500 parts of liquid ammonia and the liquid was then filtered, the catayst being removed as a fine black flocculent precipitate.

Evaporation of the liquid ammonia left behind as a residue 42.5 parts of a light yellow powder which responded to the usual tests for sodamide. Due to its finely divided form, it was very reactive and tended to ignite spontaneously or explode on exposure to air.

In many cases it is possible and convenient to use the solution of sodamide in liquid ammonia for further syntheses without isolation of the former.

*Example II*

About 0.3 part finely powdered ferric chloride ($FeCl_3.6H_2O$), was added to 350 parts by weight of liquid ammonia and then 2 parts of sodium peroxide ($Na_2O_2$) was added. The mixture was stirred while 25 parts of metallic sodium was added in small pieces. Hydrogen was evolved and the solution changed color as described in Example I. The reaction mixture was then diluted with 200 parts of liquid ammonia and 52 parts of a-chloro-styrene added drop by drop. After the reaction was complete, the intermediate product was hydrolyzed by the addition of 250 parts of water. The solution was extracted with ether and extract dried and distilled. About 22 parts of phenyl-acetylene, b. p. 140°–143° C., was obtained. The above synthesis is analogous to that of Bourgel, Ann. chim. (10) 3, 225 (1925), who obtained phenyl-acetylene by the action of sodamide on a-bromo-styrene.

Other salts of iron than those given in the above examples may be employed as catalysts. For example, ferric bromide, ferric sulfate and ferric acetate may be advantageously used. The salts of cobalt and nickel also catalyze the reaction between sodium and liquid ammonia, but not to as great an extent. It is preferable, therefore, to use an iron salt rather than a salt of one of the other two metals. In general, it may be said, however, that any hydrated salt of iron, cobalt, or nickel, which is soluble in ammonia may be used according to the present process to catalyze the reaction of an alkali metal with ammonia.

Likewise, although sodium is a preferred reactant and sodium oxides are preferred catalysts, the invention is applicable broadly to the reaction of alkali metals with liquid ammonia. Thus, potassium may be used in place of sodium in the above examples, and it will be understood that although the invention is illustrated by applying it to sodium, it is applicable to other alkali metals to which similar considerations apply.

It has been found that the rate of reaction is directly proportional to the concentration of catalyst salt used and that a most convenient rate is obtained by using 0.001 mole of catalyst for each mole of sodium. More or less than this may be used if a faster or a slower reaction is desired.

The oxides of the alkali metals, for example, sodium, appear to act as promoters of the heavy metal catalysts, although it is not intended that the present invention shall be limited by any such interpretation of the facts. The reaction rate is not greatly affected by the amount of sodium oxide or other alkali metal oxide present beyond the minimum amount. It has been found most convenient to have present, as such 1–3% of sodium oxide based on the weight of sodium, and corresponding amounts in the case of the other alkali metals but under some circumstances, such as when the exclusion of water is difficult, it may be desirable to add or form in situ greater amounts of sodium oxide to assure the presence of at least 1 to 3% of sodium oxide as such during the reaction. Thus, in the above examples greater amounts are added. Preferably, the sodium oxide is formed in situ, as in Example I, rather than added as such in the form of sodium oxide or sodium peroxide. The latter method is less advantageous, since the sodium oxides of commerce are usually contaminated with sodium hydroxide, which adversely affects the desired reaction.

The reaction between sodium and ammonia can most conveniently be carried out at the boiling point of ammonia at normal pressures, −33° C. However, by the use of pressure equipment, a more rapid reaction can be obtained by using higher temperatures than this up to the critical temperature of ammonia, 132° C., and by cooling, lower temperatures can be used although not so advantageously due to the equipment required and the slower reaction time.

It appears that the reaction, disregarding catalysts, may be represented by the following equation, although it is to be distinctly understood that the invention is not intended to be limited by this theory as to its nature.

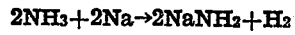
$$2NH_3 + 2Na \rightarrow 2NaNH_2 + H_2$$

It has been found, however, that it is preferable to have an excess of ammonia present over that required to react with the sodium present according to the above equation, since the ammonia appears to serve both as a reactant and as a solvent. It has further been found to be advantageous to have enough of an excess of ammonia present to act as a solvent not only because it assists the production of large yields in a relatively short time, but also because the resulting product, a solution of the amide in ammonia is a preferred product. The amide in solution in the ammonia is easier to handle than the isolated amide. It is within the scope of this invention to use other proportions of reactants, however, if desired.

As is apparent from the examples, the course of the reaction may be followed by observing the color of the solution of the reactants. When the reaction is complete the reaction mass may, if desired, be diluted by the addition of more liquid ammonia and either used in that form for further syntheses or treated to isolate the alkali amide, as by filtration followed by evaporation of the ammonia or treated by any desired method with or without dilution.

As will be observed, the present invention possesses several advantages, among them suitable reaction speed at low temperatures. A further advantage of the reaction is that sodamide is obtained in dissolved form. As shown by Hunt and Boncyk. J. A. C. S. 55 3530 (1933), commercial sodamide is not very soluble in liquid ammonia. This is probably due to its physical form and to impurities present. By the practice of the present invention, solutions of moderate concentration can be readily obtained.

Such solutions can be used to obtain suspensions of sodamide in a finely divided and reactive form in solvents other than ammonia. For example, by mixing toluene with an ammonia solution of sodamide and warming to remove ammonia, the sodamide is left suspended in the toluene. Such a suspension is more easily prepared and more reactive than one obtained by the process of German Patent 561.814 (1930).

It is apparent that many widely different embodiments of this invention may be made without departing from the spirit and scope thereof and, therefore, it is not intended to be limited except as indicated in the appended claims.

I claim:

1. The process of making alkali metal amides by reacting an alkali metal with ammonia which comprises mixing a finely powdered ammonia soluble hydrated salt of a metal of the group consisting of iron, cobalt and nickel with liquid ammonia, adding a small quantity of alkali metal, bubbling air through the mixture until the reaction is under way and then adding more alkali metal, the ammonia being maintained in excess during the reaction.

2. The process of making sodamide by reacting sodium with ammonia which comprises mixing a finely powdered ammonia soluble hydrated salt of a metal of the group consisting of iron, cobalt and nickel with liquid ammonia, adding a small quantity of sodium, bubbling air through the mixture until the reaction is under way and then adding more sodium, the ammonia being maintained in excess during the reaction.

JULIUS A. NIEUWLAND.